May 13, 1952
D. A. DURHAM ET AL
2,596,664
BOTTLE WARMER
Filed Feb. 18, 1948
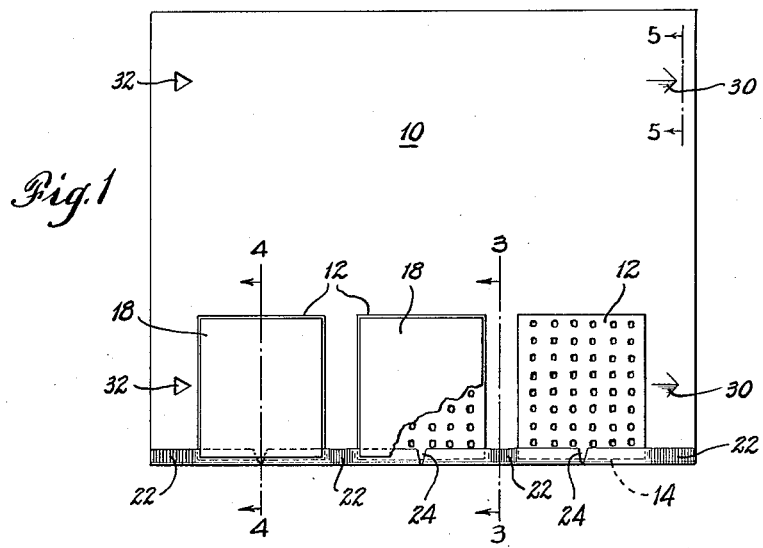
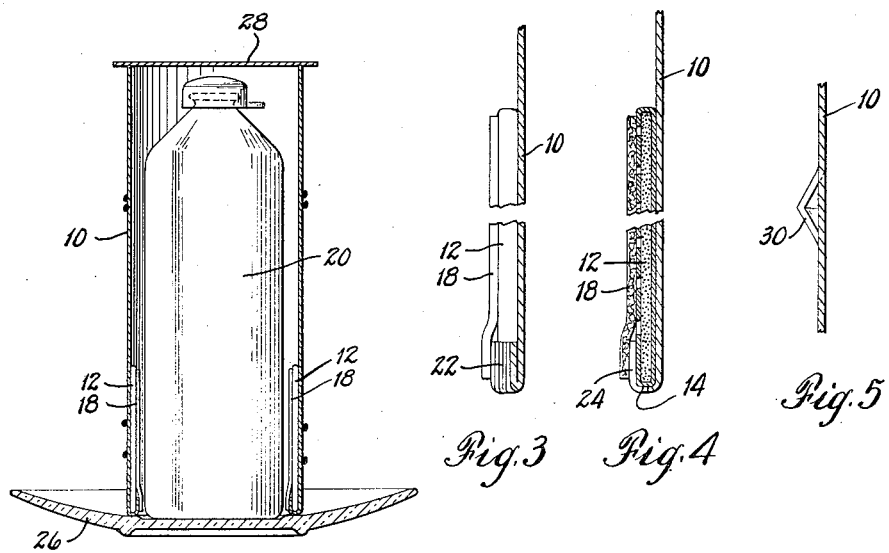
INVENTORS
Dorothy A. Durham and Howard R. Durham
BY
Morgan, Finnegan & Durham
ATTORNEYS.

Patented May 13, 1952

2,596,664

UNITED STATES PATENT OFFICE 2,596,664

BOTTLE WARMER

Dorothy A. Durham and Hobart N. Durham,
New York, N. Y.

Application February 18, 1948, Serial No. 9,124

3 Claims. (Cl. 126—263)

The present invention relates to a novel and improved warmer for baby's bottles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a side elevation of a preferred and illustrative embodiment of the present invention;

Figure 2 is a vertical section showing the heater as applied to a usual form of nursing bottle;

Figure 3 is a fragmentary section taken on the line 3—3 of Figure 1;

Figure 4 is a fragmentary section taken on the line 4—4 of Figure 1; and

Figure 5 is a fragmentary detail section taken on the line 5—5 of Figure 1.

The present invention has for its object the provision of a novel and improved bottle warmer which is portable, economical and produces a predetermined quantity of heat. A further object is the provision of a bottle warmer which is safe and simple in operation, can be used under all conditions, and is rapid in operation.

According to the present invention, a bottle warmer is provided comprising a flexible sheet of metal or other impervious material adapted to hold a plurality of exothermic heating units which are replaceably held in the sheet, the sheet being formed so as to locate the heating units and also so as to allow the flexible sheet to be wrapped around the bottle to be heated and secured in tubular form during the heating operation, holding the heating units in contact with the bottle and to prevent circulation of air around the bottle. The flexible sheet is preferably of much lower heat capacity than the bottle to be heated so that the steam generated during the heating of the exothermic units is preferentially condensed on the surface of the bottle, thereby transferring most of the heat by direct contact with the bottle and thereby to the contents. During operation, the open top of the tubularly formed flexible sheet is closed, as by a flat sheet to prevent excessive circulation of air.

It will be understood that the foregoing general description and the following detailed description as well are exemplary and explanatory of the invention but are not restrictive thereof.

Referring now in detail to the illustrative embodiment of the invention as shown in the accompanying drawings, there is provided a sheet of thin impervious material 10, such as polished sheet aluminum, about .003" to .006" thick. Means are provided on the inside face of the sheet 10 for securing in place a plurality of exothermic heating units 12, preferably close to the bottom edge of the sheet 10 and in suitably spaced apart relation, so the units 12 are uniformly spaced when the units 12 and sheet 10 are wrapped about the bottle to be heated and in contact therewith. For this purpose, the lower edge of the sheet 10 is formed as a shallow trough 14 to receive the bottom edges of the exothermic heating units 12.

The heating units 12 may be of different forms, but are preferably small thin flexible envelopes filled with an exothermic composition adapted to give off heat at a moderate rate when moistened, and may be constructed in accordance with the prior patent to Evans & McDonough, No. 2,151,692, while the composition may be in accordance with the patent to Evans & McDonough, Reissue 22,660, or any other suitable composition and structure. In the preferred form, the exothermic pad is formed with a perforated face, adapted to be positioned towards the bottle to be heated and to be covered with a web absorbent sheet 18 which supplies moisture to cause reaction of the exothermic composition.

In order to permit wrapping of the flexible sheet 10 and exothermic units 12 about the bottle 20, the trough-like edge 14 is crimped at spaced points 22 between the units 12 and is slotted as at 24 midway of the units 12, thereby allowing the units 12 and trough 14 to bend without crimping the metal which would otherwise occur and would interfere with replacement of the units 12. As shown, the metal sheet 10 and units 12 normally bend along vertical lines extending from the crimped portions 22 and the slots 24, thereby conforming the tubular sheet to the general exterior of the conventional hexagonal or cylindrical bottle 20.

Figure 2 shows the device of the present invention in use for heating a nursing bottle. As shown, the bottle 20 is resting on a saucer 26 or other support. Against it are held a plurality of the web absorbent sheets 18, and the associated heating units 12 held in position in the trough 14, metal sheet 10 being wrapped into a tube to hold the units 12 tightly against the surface of the bottle 20 near its bottom. The metal sheet 10 is held in tubular form by any suitable means such as rubber-bands around the tube, and the tube is closed at the top by means of a flat sheet 28 so as to prevent loss of heat.

The low mass of the sheet 10 and its heat reflectivity allows it to heat more rapidly than the bottle. It soon reaches a sufficiently high temperature so that in the small air space between the sheet 10 and the bottle 20 the steam generated by the units 12 preferentially condenses on the bottle transferring heat to the bottle. The units 12 also transfer heat by conduction to the bottle 20.

Instead of rubber-bands to hold the sheet 10 to tubular form, hook portions 30 may be formed integrally with the sheet 10 by punching, the hooks being adapted to underlie and engage in registering apertured slots 32 so as to form releasable hook and eye connections holding the tube closed.

The invention in its broader aspects is not limited to the specific mechanisms shown and described but departures may be made therefrom within the scope of the accompanying claims without departing from the principles of the invention and without sacrificing its chief advantages.

What is claimed is:

1. A bottle warmer comprising a flexible, impervious metal sheet of low heat capacity, means on the lower part of one face of said sheet to receive and hold a plurality of thin, flexible, exothermic heating units on the lower part of the sheet said units being adapted to generate steam upon addition of water thereto and means for holding the flexible sheet wrapped as a tube adapted to receive a bottle to be heated with the heating units in contact with the bottle, whereby the bottle warmer when closed will permit a transfer of heat by the condensation of the steam on the bottle.

2. A bottle warmer according to claim 1 in which one edge of the metal sheet is formed as a trough to receive the flexible heating units.

3. A bottle warmer according to claim 2 in which the edge forming the trough is provided with alternate crimped and slotted portions.

DOROTHY A. DURHAM.
HOBART N. DURHAM.

REFERENCES CITED

The following references are of record in the file of this patent:

UNITED STATES PATENTS

| Number | Name | Date |
| --- | --- | --- |
| 538,056 | Wilder | Apr. 23, 1895 |
| 1,717,132 | Weinmann | June 11, 1929 |
| 1,894,798 | Seward | Jan. 17, 1933 |
| 2,151,692 | Evans et al. | Mar. 28, 1939 |
| 2,185,799 | Blake, et al. | Jan. 2, 1940 |
| 2,355,739 | McCabe | Aug. 15, 1944 |
| 2,384,720 | Babcock et al. | Sept. 11, 1945 |